United States Patent [19]

Yao

[11] 3,760,381

[45] Sept. 18, 1973

[54] STORED CHARGE MEMORY DETECTION CIRCUIT

[75] Inventor: Ying Luh Yao, Mahopac, N.Y.

[73] Assignee: International Business Machines Corporation, Armonk, N.Y.

[22] Filed: June 30, 1972

[21] Appl. No.: 267,881

[52] U.S. Cl. ............ 340/173 R, 307/238, 307/239, 340/173 CA

[51] Int. Cl. ........................ G11c 11/24, G11c 7/06

[58] Field of Search .................... 340/172.5, 173 R, 340/173 CA; 307/238, 239

[56] References Cited

UNITED STATES PATENTS

| | | | |
|---|---|---|---|
| 3,514,765 | 5/1970 | Christensen | 340/173 R |
| 3,665,422 | 5/1972 | McCoy | 340/173 R |

OTHER PUBLICATIONS

Askin, Memory Regeneration Method, IBM Technical Disclosure Bulletin, Vol. 14, No. 6, 11/71, p. 1769.

*Primary Examiner*—Bernard Konick
*Assistant Examiner*—Stuart Hecker
*Attorney*—Thomas J. Kilgannon, Jr. et al.

[57] ABSTRACT

A sensing circuit which is responsive to binary information represented by the level of charge in a capacitor is disclosed. The circuit comprises a differential amplifier; the nodes of which are connected to bucket brigade sense amplifier arrangements which are in turn connected to bit lines to which a plurality of memory device which store information in the form of charge are connected. Each bit line portion connected to the bucket brigade sense amplifier represents half of a bit line to which a plurality of storage devices (such as a capacitor in series with an FET gate) are connected. Each half of the bit line is also connected to a reference capacitor via an actuable FET device or other stored charge memory device. Each of the bucket brigade sense amplifiers consists of an output capacitance which is connected in parallel with the bit line capacitances of each half of the bit line via an actuable FET device. A source of voltage for charging the bit line capacitances is connected to the bit line halves via an actuable FET device and is utilized to charge the bit line capacitance, the output capacitance and a reference capacitor of one of the bit line halves.

In operation, both bit line halves are charged to some voltage which is usually equal to the voltage to which the capacitance of a selected memory cell can be charged. At the same time, a reference capacitor is charged to approximately one half the voltage to which the selected cell capacitance can be charged. If the reference capacitor is to be charged to half the voltage of a storage cell, the size of the reference capacitor should be equal to that of the storage capacitor. Another way of implementing the reference capacitor is to use a reference capacitor half the size of a storage capacitor and discharge it completely each time before selecting a memory cell. If the memory cell capacitor is charged to full voltage (representing a binary "1") when the word line of the memory cell is activated for reading, no charge will flow from the bit line capacitance to the memory cell capacitance because both are at the same level. If the memory cell capacitance were empty (representing a binary "0") charge would flow from the bit line capacitance when reading occurred, filling the memory capacitor and reducing the bit line capacitor voltage by a small ion. When the bucket brigade circuit is actuated, no charge transfer occurs where the memory capacitor was full and a voltage approximately equal to the bit line charging voltage appears on one node of the differential amplifier. Where the memory capacitor was initially empty, charge transfer occurs to refill the bit line capacitance to its original level thereby depleting the output capacitance of charge and causing zero potential to be applied to one node of the differential amplifier. Simultaneously, with the appearance of the bit line charging voltage or zero at one node of the differential amplifier, a voltage equal to approximately half the bit line charging voltage appears at the other node of the differential amplifier. This results from the charging of the reference capacitance to one half the charging voltage. When reading of the reference capacitance occurs, charge from the bit line capacitance charges the reference capacitor up to its full value, depleting the bit line capacitance of an amount of charge equal to half the charge depleted from the opposite bit line capacitance when a memory cell storing a "0" is selected. When the bucket brigade sense amplifier is actuated, charge from the output capacitance thereof replenishes the bit line capacitance and leaves the output capacitance at a value of voltage approximately equal to one half of the charging voltage. In this manner, when a selected memory device associated with one half of a bit line is being read, the reference capacitance associated with the other half of the bit line is utilized to provide a voltage which is always the same regardless of the voltage on the selected device. The appropriate reference capacitor is selected by arranging the decoding such that when a memory device on one bit line half is selected, the reference capacitor on the other bit line half is always selected.

30 Claims, 4 Drawing Figures

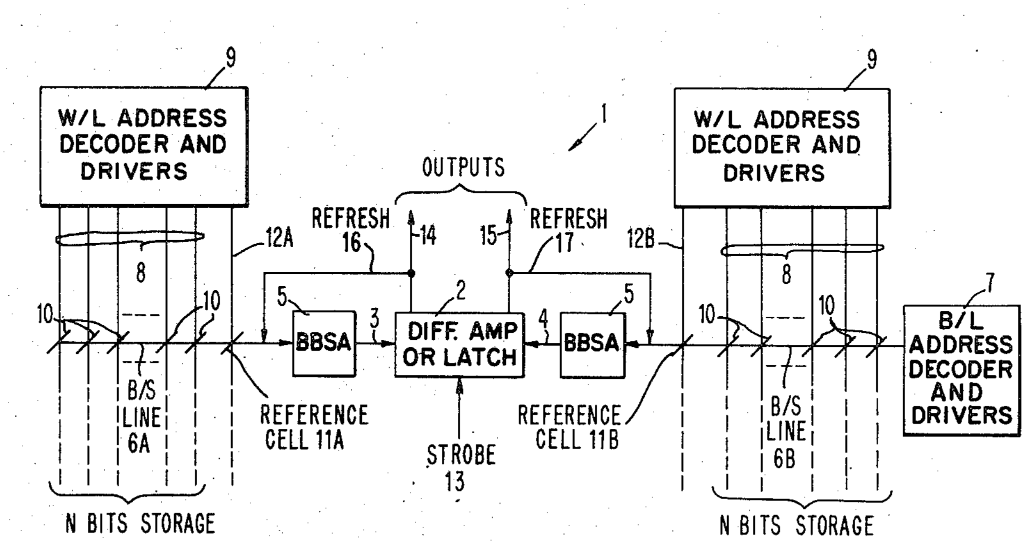
W/L ADDRESS DECODER AND DRIVERS
9
1
OUTPUTS
REFRESH 16
14
15
REFRESH 17
12A
12B
8
10
5
2
3
4
BBSA
DIFF. AMP OR LATCH
B/S LINE 6A
B/S LINE 6B
REFERENCE CELL 11A
REFERENCE CELL 11B
STROBE 13
N BITS STORAGE
7
B/L ADDRESS DECODER AND DRIVERS

STORED CHARGE MEMORY DETECTION CIRCUIT

BACKGROUND OF THE INVENTION

1. Field of the Invention

This invention relates generally to circuits for the signal detection of memory devices wherein binary information is represented by the level of charge. More specifically, it relates to a circuit arrangement which utilizes a reference cell in combination with a bucket brigade sense amplifier for each half of a bit line to provide relatively high levels of voltage to the inputs of a differential amplifier or latch of reduced sensitivity compared to those required for prior art arrangements. The use of reference capacitors, only one of which is utilized during the reading of a selected memory cell, in combination with bucket brigade sense amplifiers provides both an amplifier reference signal and an amplified memory signal to the nodes of the differential amplifier permitting the sensing of signals from a larger number of storage devices per bit line and from bit lines having capacitances which are greater than 100 times the capacitance of the storage device.

2. Description of the Prior Art

U.S. Pat. No. 3,514,765 shows a charge storage sensing circuit consisting of a latch or differential amplifier arrangement which, like the present invention, incorporates the charging up of the bit line capacitance of two halves of a bit line to a given value of voltage. This given value is applied to one input of an FET latch operating in a race mode while, at the same time, the same given voltage plus the voltage of the selected cell is applied to the other input of the latch. The latch amplifier then switches in response to a small difference in voltage provided by the change of the bit sense line voltage due to the charge redistribution between a selected cell capacitance and its associated bit sense line. The arrangement of the patent requires a latch or amplifier of rather fine sensitivity since only a relatively small amount of charge can be added to the bit line capacitance particularly where the memory storage device capacitance is made extremely small to satisfy area and packing density design requirements.

Since the direction in which memory arrays of the type shown in the patent are going is one which requires higher density, it should be clear that the sensitivity requirements on its differential amplifier will become more and more stringent until that parameter becomes the limiting factor in the design of such memory arrays. Any system, therefore, which would avoid the limitations imposed by requiring more and more sensitive amplifiers should find wide acceptance in the semiconductor memory art on that basis alone. The circuit of the present disclosure has no such limitation and while avoiding the necessity for using high sensitivity amplifiers, it also permits the use of a greater number of storage devices per bit line. In addition, higher density arrays can be achieved because there is no limitation imposed on the size of the storage device capacitance to satisfy the minimum output signal requirements of the differential amplifier.

SUMMARY OF THE INVENTION

The circuit of the present invention in its broadest aspect relates to a sense amplifier for sensing the charge condition of at least a selected one of a plurality of memory devices in a memory array which store information in the form of charge connected to pairs of bit line elements having bit line capacitances associated therewith via actuable gating devices and comprises a reference charge storage device connected via a first actuable gate to each of the bit line elements. It further includes amplifier means having first and second terminals responsive to a difference in voltage at the terminals and between each terminal of the amplifier and a bit line element. Charging means connected to the bucket brigade amplifier means are utilized for charging the output capacitance and the bit line capacitance to approximately the same voltage. The same charging means is also utilized to charge one of the reference charge storage devices via the first actuable gate to a voltage less than the first mentioned voltage. An actuable pulse source connected to the gating device of the selected memory device causes either the transfer of charge from the bit line capacitance of one of the bit line elements when the memory device is empty of charge or, transfers no charge when the memory device is filled with charge and results in the charging up or the holding of the memory device at the first mentioned voltage level. Another actuable pulse source connected to the actuable gate of the reference device causes the transfer of charge from the bit line capacitance of the other of the bit line elements to its associated reference device to charge it to a voltage less than the first mentioned voltage. Finally, means are connected to each bucket brigade amplifier and to the output capacitances for either transferring a charged or uncharged condition from one output capacitance to the bit line capacitance of one of the bit line elements and for transferring a charge condition from the other output capacitance to the bit line capacitance of the other of the bit line elements to provide at one terminal the first mentioned voltage or zero voltage and at the other terminal of the amplifier the voltage less than the first mentioned voltage but higher than zero voltage.

In accordance with some specific aspects of the present invention, the sense amplifier of the memory array further includes means connected to the amplifier means for enabling it when the first mentioned voltage or zero appears on one terminal and when the voltage less than the first mentioned voltage appears at the other terminal.

In accordance with still more specific aspects of the present invention, the bucket brigade sense amplifiers of the memory array sense amplifier each include a second actuable gate interconnecting the bit line capacitance and its output capacitance and, first and second pulse voltage sources connected to the second actuable gate and to the output capacitance, respectively. These sources are actuated simultaneously to either replenish or not replenish the bit line capacitance with charge from the output capacitance during a bucket brigade transfer period.

In accordance with still more specific aspects of the invention, the memory array sense amplifier further includes a means connected to the plurality of stored charge memory devices for setting at least one of the devices in either a charged or uncharged condition.

Finally, in accordance with still more specific aspects of the present invention, the above-mentioned means for setting includes an actuable gate disposed in series with each memory device, word line and bit line decoders, the outputs of which are connected to word and bit line drivers; the coincidental occurrence of the outputs of the driver actuates the actuable gate to set the memory device in a charged or uncharged condition.

It is therefore an object of the invention to provide a sense amplifier which eliminates the problem of device and process parameter variations while at the same time providing more net output signal.

Another object is to provide a sensing circuit which permits the obtaining of more net yield after fabrication and consequently lower cost.

Still another object is to provide a memory array sense amplifier which is completely balanced, thereby eliminating all noise signal due to read and write operations.

Still another object is to provide a sense amplifier which provides an output signal which is not limited by the capacitance of the charged storage devices being sensed and which permit the fabrication of arrays containing more of such storage devices per bit line.

Another object is to provide a sense amplifier which senses signals from bit lines having capacitances greater than one hundred times the capacitance of the charged storage device.

The foregoing and other objects, features and advantages of the invention will be apparent from the following more particular description of a preferred embodiment of the invention as illustrated in the accompanying drawings.

BRIEF DESCRIPTION OF THE DRAWINGS

In FIG. 1, a differential amplifier is fed on one side from a charge storage device associated with one bit line element via a bucket brigade sense amplifier and on the other side from a reference cell associated with another bit line element via a bucket brigade sense amplifier. The circuit shown represents a single bit line of a memory storage array which contains a plurality of bit lines and sense amplifiers.

DESCRIPTION OF THE PREFERRED EMBODIMENT

Figure 1:
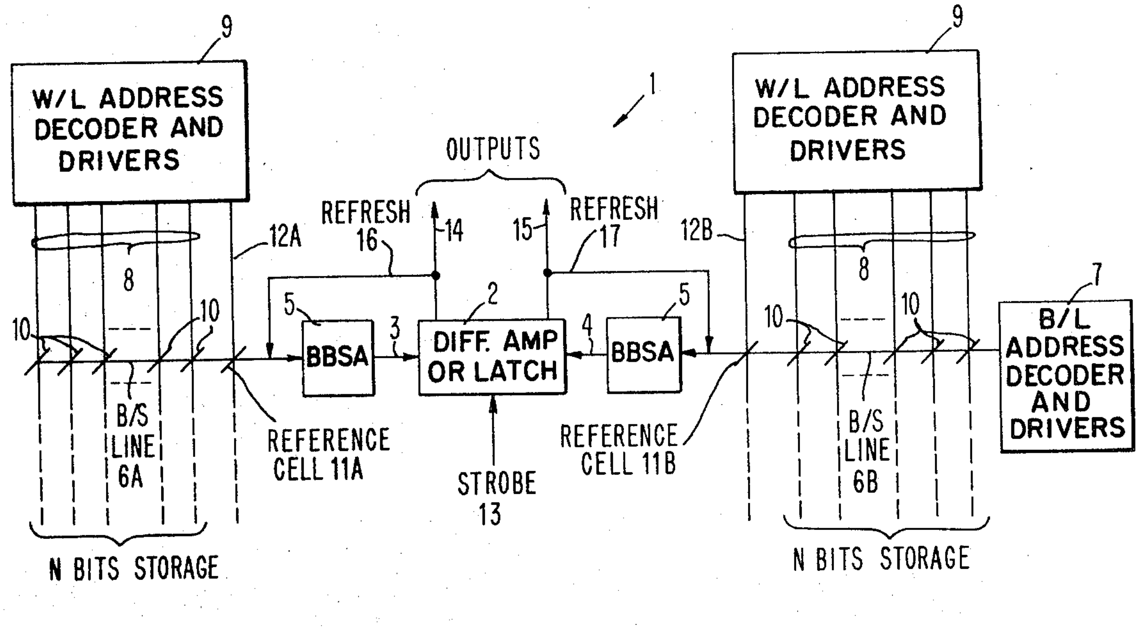
FIG. 1 is a partial schematic, partial block diagram of a charge storage memory array showing a sense amplifier in accordance with the teaching of the present invention.

Referring now to FIG. 1, there is shown therein a partial schematic-partial block diagram of a sense amplifier circuit in accordance with the teaching of the present invention. The sense amplifier shown generally at 1 consists of a differential amplifier or latch 2, having first and second terminals 3, 4, respectively, each of which are connected to a bucket brigade sense amplifier 5 hereinafter called BBSA. BBSA 5 is shown and discussed in detail hereinafter in connection with FIG. 3. Each BBSA 5 is connected to a bit sense line element 6A, 6B, hereinafter called B/S line, both of which form a single bit sense line which is addressed via a bit line address decoder and driver arrangement in block 7 shown connected to B/S line 6B in FIG. 1. Bit line address decoder and driver block 7 is a standard arrangement well known to those skilled in the semiconductor art and has not been shown in detail since any standard decoder and driver arrangement may be utilized herein. While it has not been specifically shown in FIG. 1, it should be appreciated that when a particular bit/-sense line is energized from bit line address decoder and driver block 7 that both B/S lines 6A, 6B are simultaneously energized. It should also be appreciated that a plurality of bit lines emanate from bit line address decoder and driver block 7 to form, in conjunction with a plurality of intersecting word lines, a memory array containing a storage position or memory bit at each intersection of a bit line and a word line. In FIG. 1, word lines 8 are energized from word line address decoder and driver block 9 which, like bit line address decoder and driver block 7, are decoder and driver arrangements well known to those skilled in the semiconductor memory arts. Thus, any standard decoder and driver arrangement may be utilized in the practice of the present invention. Each word line 8, at its intersection with B/S lines 6A, 6B is connected to a charge storage device 10 shown diagrammatically in FIG. 1 as a slanted line at the intersection of each word line with B/S lines 6A, 6B. Charge storage memory devices 10 may be any device which exhibits capacitance but, for purposes of exposition, it will be defined as a storage capacitor CS connected in series with B/S lines 6A, 6B via an actuable gate which may be a field effect transistor. This is similar to the arrangement shown in FIG. 1 of U. S. Pat. No. 3,387,286 entitled "Field Effect Transistor Memory" issued June 4, 1968 in the name of R. Dennard, and assigned to the same assignee as the present invention and explained in more detail hereinbelow in connection with FIGS. 2, 3. Each B/S line 6A, 6B has a reference cell 11A, 11B, respectively, which is similar in every respect to memory devices 10 except that the reference capacitor may have a smaller capacitance than the capacitance of the storage capacitors of stored charge memory devices 10. Reference cells 11A, 11B are activated from the word line address decoder and driver blocks 9 via word lines 12A, 12B, respectively.

The selection or decoding of the proper reference cell 12A or 12B is accomplished by utilizing the most significant bit of the input address of the word line decoders 9. Assuming that there are n addresses to decode word lines 8 ($2^0, 2^1, \ldots 2^n$) and that all storage cells 10 associated with B/S line 6A are selected by an address $2^n$ and that the storage devices 10 associated with B/S line 6B are selected by an address $\overline{2^n}$ (where $\overline{2^n}$ represents the logic complement of $2^n$), addresses $\overline{2^n}$ and $2^n$ are used to select reference cells 11A and 11B, respectively. Therefore, when a storage device 10 associated with a B/S line is selected, the reference cell 11A or 11B of the other B/S line is selected while the reference cell 10 on the same B/S line is inhibited.

Once differential amplifier or latch 2 receives inputs at terminals 3, 4, a pulse from strobe 13 enables latch 2 and outputs are provided on leads 14, 15. At the same time an output is obtained, a storage device cell 10 which has just been sensed is refreshed via refresh conductors 16, 17 which are connected to output leads 14, 15 respectively. The refresh of a storage device 10 is necessary where the storage device is a capacitor since read out of such a device is destructive in character.

At this point, it should be appreciated that each pair of B/S lines 6A, 6B require a pair of BBSA's 5, a pair of reference cells 11A, 11B and a differential amplifier or latch 2. Since reference cells 11A, 11B are substantially identical with storage devices 10, the addition of such devices add little to the area requirements particularly where the actuable devices utilized are field effect transistors. Also, where the overall design of circuit 1 utilizes FET's in the design of BBSA 5, it should be clear that circuit 1 can be totally fabricated on a single semiconductor chip utilizing the same process steps.

Figure 2:
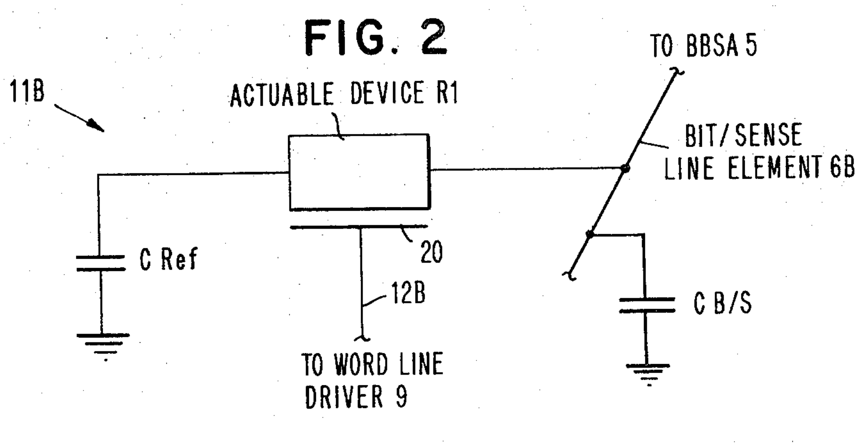
FIG. 2 is a schematic diagram of a reference cell connected to a bit sense line element which has associated therewith a bit line capacitance. The reference cell consists of an actuable gate disposed in series with a reference capacitor.

Referring now to FIG. 2, there is shown therein a schematic diagram of reference cell 11B which incorporates a capacitor Cref connected to B/S line 6B via an actuable device R1. R1 is a field effect transistor which is normally off and is actuated by applying a signal on lead 12B from word driver 9 to gate electrode 20 of actuable device R1. When actuable device R1 is energized simultaneously with the appearance of a signal on B/S line 6B, capacitor Cref is charged and continues to charge as long as gate electrode 20 is energized via conductor 12B from its word line driver 9. The capacitance of capacitor Cref is preferably the same as the capacitors associated with charge storage devices 10. However, as will be seen in connection with a discussion of the operation of the circuit of FIGS. 1 and 2, capacitor Cref is normally charged up to a voltage which is less than the full storage cell voltage. Preferably, Cref is charged up to approximately half the voltage the storage cell is charged to under a stored "1" condition. Charging Cref to the desired value can be accomplished by controlling the bit/sense line voltage during the time device R1 is actuated. Another approach which may be utilized but which increases the fabrication difficulties somewhat is to provide a capacitor of one-half the capacitance which can be discharged or maintained at zero voltage. In both cases, the Cref will deplete the same amount of charge from the associated bit/sense line when the reference cell is selected.

Figure 3:
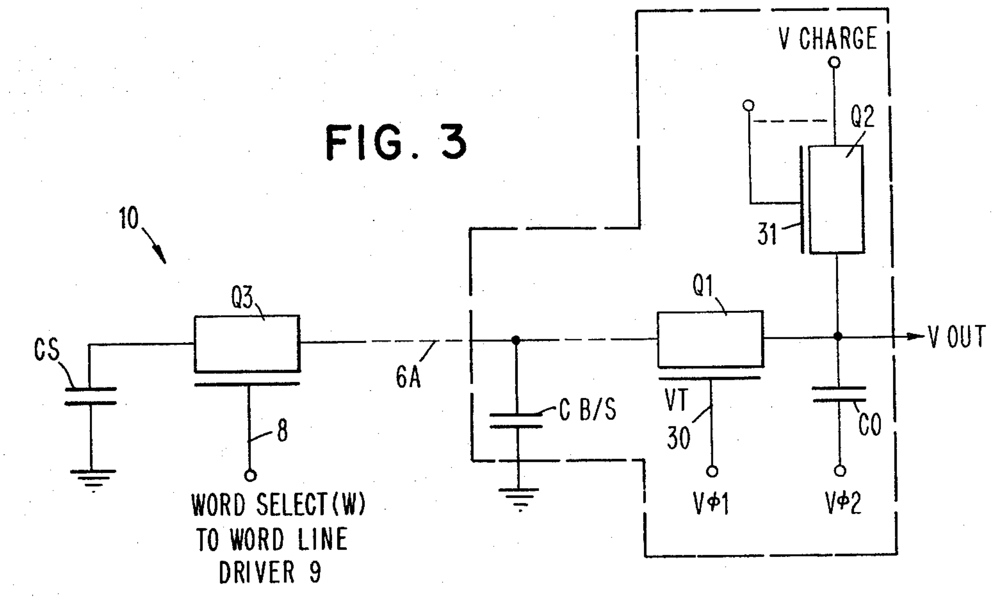
FIG. 3 is a schematic diagram of a bucket brigade sense amplifier consisting of a bit line charging circuit and a bucket brigade transfer circuit connected in series with a charge storage capacitor via an actuable gate. The arrangement of FIG. 3 is utilized to provide either a given voltage or zero voltage at Vout representative of a binary "1" or a binary "0," respectively.

Referring now to FIG. 3, a charge storage memory device 10 is shown connected to a BBSA shown within dashed box 5. BBSA 5 includes the bit line capacitance of a B/S line 6A, for example, and is indicated schematically in FIG. 3 by a capacitor labelled CB/S. BBSA 5 also includes an output capacitance labelled C0 in FIG. 3, one side of which is connected to a pulse voltage source V$\phi$2 and the other side of which is connected to a pulsed source labelled Vcharge via an actuable device Q2 which, in FIG. 3, is shown as a field effect transistor. C0 is also connected via an actuable device Q1 to the bit line capacitance CB/S. Actuable device Q1 is a field effect transistor having a threshold voltage VT the gate connection 30 of which is connected to a pulsed source labelled V$\phi$1. C0 ultimately provides an output voltage to differential amplifier or latch 2 and is indicated in FIG. 3 as Vout. Gate electrode 31 can be connected to the drain of device Q2, as shown by the dotted line in FIG. 3, so that device Q2 is actuated when pulsed source Vcharge is actuated. A separate control voltage can be used to control gate electrode 31 separately from the drain electrode of Q2 which is connected to Vcharge.

Charge storage memory device 10, in FIG. 3, consists of a charge storage capacitor labelled CS which is connected to bit line capacitance CB/S via an actuable device Q3. Device Q3 is a field effect transistor which is actuated via word line 8 by a signal from word line driver 9. As indicated hereinabove, the capcitance value of capacitor CS, in a preferred mode, is the same as the capacitance of Cref. The capacitance of capacitor C0 is also approximately the same as the capacitance value of storage capacitor CS. The value of the bit line capacitance CB/S, asindicated hereinabove, may be greater than 100 times the capacitance of the memory device storage capacitor CS. The present ciruicit arrangement permits such a relationship and is a particular feature of the present invention inasmuch as prior art arrangements permit bit line capacitances CB/S which are only five to 10 times greater than CS.

Referring again to FIGS. 1, 2 and 3, the operation of circuit 1 of FIG. 1 will be discussed in conjunction with the pulse patterns shown in FIG. 4. In discussing the operation of FIG. 1, it is assumed for purposes of description that the reference cell 11B is the reference cell actuated when one of the charge storage memory devices 10 of B/S line 6A is selected. It is also assumed that the charge storage memory device 10 selected is the one shown in FIG. 3 connected to BBSA 5 via bit line 6A and provides an output via terminal 3 to differential amplifier or latch 2 of FIG. 1. Also, since the operation of BBSA 5 is the same for both B/S line 6A, 6B, BBSA 5 of FIG. 3 can be utilized to show the application of a reference voltage to terminal 4 of differential amplifier or latch 2.

Prior to the selection of a stored charge memory device 10 which is to be read, precharging of the bit line capacitances CB/S of B/S lines 6A, 6B is carried out. Focusing, however, only on B/S line 6A, for the moment, its bit line capacitance CB/S as shown in FIG. 3 is charged by raised pulsed source Vcharge to a positive potential and at the same time raising pulsed source V$\phi$1 to the same potential during the precharge period shown in FIG. 4. As a result, actuable devices Q1 and Q2 are simultaneously actuated charging bit line capacitance CB/S of B/S line 6A to a potential equal to the potential of V$\phi$1 minus the threshold voltage VT of device Q1. Pulsed sources V$\phi$1 and Vcharge, when actuated, achieve the same maximum value of voltage. During the precharge period, pulsed source V$\phi$2 is inactive and at ground potential and, as a result, output capacitor C0 charges up to the value of pulsed source Vcharge.

Figure 4:
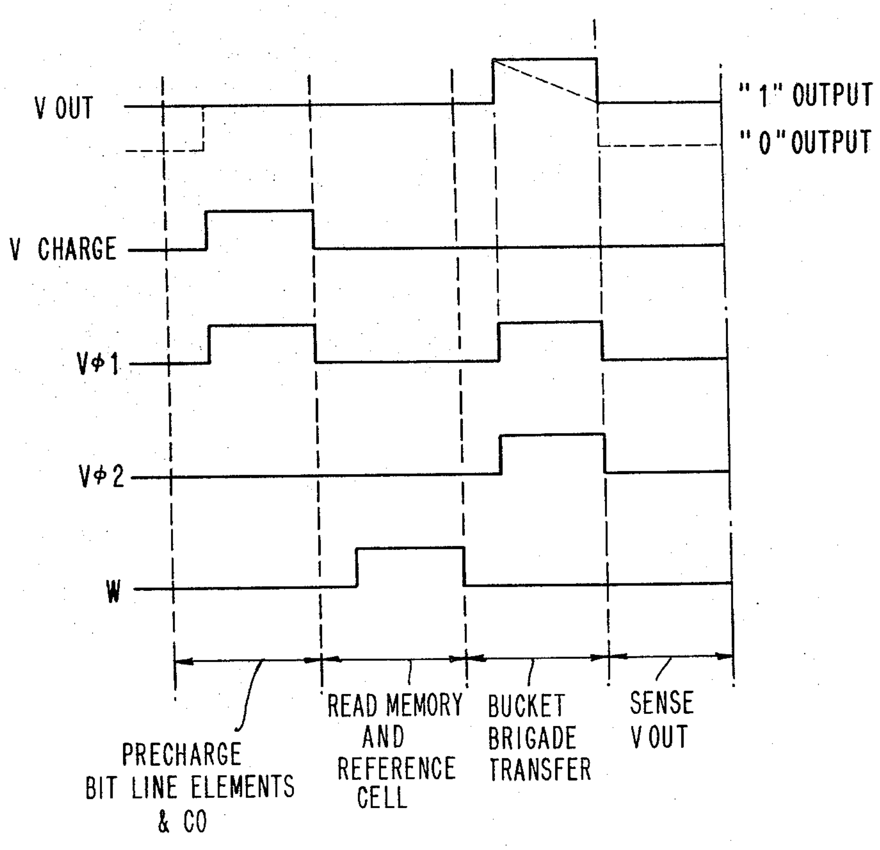
FIG. 4 shows the pulse patterns utilized in actuating the circuits of FIGS. 1, 2, 3 during precharge, read, bucket brigade transfer and sense periods.

After the precharge period shown in FIG. 4, reading of the charged storage memory cell 10 of FIG. 3 and reference cell 11B shown in FIG. 2 takes place during a reading period. Reading of the capacitor CS of stored charge memory cell 10 will be considered first.

Where capacitor CS of memory device 10 is fully charged, representing a binary "1," for example, when word line 8 in FIG. 3 is activated by applying a positive pulse shown at W in FIG. 4 from word line driver 9, actuable device Q3 is rendered conductive. No charge is transferred, however, because capacitors CS and CB/S are at the same potential. The charge on capacitor CS was previously provided during a write cycle from bit line address decoder and driver block 7. Alternatively, the charge for CS after reading may be provided via refresh conductor 16 shown in FIG. 1. In any event, operation of the arrangement of FIG. 3 depends upon capacitors CS and CB/S being at approximately the same potential. It should be recalled that the potential on capacitor CB/S is equal to the maximum potential of pulse source Vϕ1 minus the threshold voltage of device Q1. Continuing with the operation of FIG. 3, following the read period a bucket bridage transfer period occurs during which pulse sources Vϕ1 and Vϕ2 are simultaneously actuated. At this point, it should be appreciated that when capacitor CB/S reached the potential Vϕ1 − VT, actuable device Q1 became cut off and no further condution via Q1 is possible. Thus, when pulse source Vϕ1 and Vϕ2 are actuated, there is no charge transfer because no condution is possible via device Q1. When the buckel brigade transfer period is over, the potential appearing at Vout is the potential on C0 which had initially been charged to the potential of pulsed source Vcharge. Thus, when capacitor CS is fully charged, the potential appearing at terminal 3 of differential amplifier or latch 2 in FIG. 1, is a potential substantially equal to that appearing on capacitor CS.

If, however, the charge on capacitor CS is zero, representing a binary "0," and sssuming that capacitor C0 and bit line capacitance CB/S have been charged up as indicated previously to Vcharge and Vϕ1 − VT, respectively, when word line 8 of device Q3 is activated during the reading period, bit line capacitance CB/S of FIG. 3 discharges via device Q3 reducing the potential of capacitance CB/S by the amount of charge transferred to capacitor CS. Thus, the potential of bit line capacitance CB/S drops ever so slightly because the amount of charge available on capacitor CB/S is quite large. This small amount of charge, however, is sufficient to charge up capacitor CS to the full value of its capability because of its small capacitance relative to the bit line capacitance. In any event, bit line capacitance CB/S drops slightly in voltage due to the loss of charge to capacitor CS. At this point, the read period is over and the bucket brigade transfer period begins. Pulsed sources Vϕ1 and Vϕ2 are activated and, because the potential of bit line capacitance CB/S is no longer at a potential, Vϕ1 − VT, but at some value less than this, actuable device Q1 turns on until this value is reached, charging up capacitor CB/S to its previous value of Vϕ1 − VT. The pulsing of pulsed source Vϕ2 as shown in FIG. 4 during this period merely serves to drive the charge from output capacitor C0 to capacitor CB/S very quickly when Q1 becomes conductive as a result of the simultaneous activation of pulsed source Vϕ1. When the bucket brigade transfer period is over, the potential on output capacitor C0 appears at Vout and is applied to terminal 3 of differential amplifier or latch 2. Thus, when capacitor CS is empty of charge representing a binary zero, zero potential appears at terminal 3 of differential amplifier or latch 2.

Considering now the other terminal 4 of differential amplifier or latch 2, it should be recalled that reference cell 11B associated with B/S line 6B has been selected rather than one of the charge storage memory device cells 10 associated with the same bit line element. In FIG. 2, BBSA 5 charges up the bit line capacitance CB/S of B/S line 6B and its output capacitance C0 in the same manner described in connection with the circuit of FIG. 3. At this point, it should be recalled that C0 and the bit line capacitance CB/S of element 6B are both charged up to the maximum potential which pulsed source Vcharge attains. This is approximately twice the value of the potential appearing on capacitor Cref. Another way of charging capacitor Cref is via refresh conductor 17 which places the desired potential on capacitor Cref when differential amplifier or latch 2 is enabled by strobe 13. When the precharge period is over, word line 11B is actuated rendering actuable device R1 conductive and permitting charge to flow from capacitor CB/S into capacitor Cref to fully charge that capacitor to a potential substantially equal to the maximum potential pulsed source Vcharge attained. Thus, when the reading of capacitor Cref is over, capacitor CB/S is at a potential Vϕ1 − VT minus the small voltage change which occurred due to the charging up of Cref.

During the bucket brigade transfer period shown in FIG. 4, pulsed sources Vϕ1 and Vϕ2 are simultaneously activated and charge flows from output capacitance C0 to CB/S via Q1 until the potential Vϕ1 − VT is reached. Since capacitance CB/S was emptied of charge equal to one-half that of capacitor C0, capacitor C0 loses approximately one-half its charge and charges bit line capacitance CB/S back to the potential Vϕ1 − VT. The actuation of pulsed source Vϕ2 causes speedy transfer of this charge. When the bucket brigade transfer period is over, Vout is approximately one-half the voltage of Vref. This constitutes the other input to the differential amplifier which is applied to terminal 4 thereof. Thus, after the bucket brigade transfer period, differential amplifier or latch 2 experiences a potential approximately equal to Vref/2 at one input and a potential equal to approximately Vref or zero at its other input terminal. Sensing of the signals which appear at Vout of B/S lines 6A, 6B occurs during the sensing period shown in FIG. 4 by applying an enabling signal from strobe 13 as shown in FIG. 1 to differential amplifier or latch 2. In this manner, it is possible to provide large differences in voltage at the inputs to differential amplifier 2 permitting the use of amplifiers of reduced sensitivity over the above-mentioned prior art scheme where very small changes in voltage which were added to the bit line capacitance voltage were compared with a bit line capacitance voltage used as a reference.

The circuit shown in FIG. 1 can be embodied utilizing either *n* or *p* channel field effect transistors. Also, it should be appreciated that capacitors such as CS, C0 and Cref may by any device which exhibits capacitance such as the gate capacitance of an FET and is not limited to standard capacitors. The arrangement of the present invention finds principal utility in bit oriented memory arrays and, as such, eliminates the problem of device and process parameter variations while at the same time providing more net output signal. The approach utilized results in a completely balanced system thereby eliminatinhg all noise signal due to read, write operations, In the embodiment of FIGS. 1–3, typical values for the various elements using N-channel FET's are as follows:

| | |
|---|---|
| Vϕ1 | 10 volts |
| Vϕ2 | 10 volts |
| Vcharge | 10 volts |
| CS | 0.1 pf |
| CB/S | 10. pf |
| C0 | 0.1 pf |
| Cref | 0.1 pf |
| VT | 1 volt |

While the invention has been particularly shown and described with reference to preferred embodiment thereof, it will be understood by those skilled in the art that the foregoing and other changes in form and details may be made therein without departing from the spirit and scope of the invention.

What is claimed is:

1. A sense amplifier for sensing information in the form of stored charge comprising an amplifier responsive to differences in potential applied thereto, a pair of bit line elements electrically coupled to said amplifier, a plurality of first capacitances and second, third and fourth capacitances electrically coupled to each of said bit line elements, means connected to at least one of said plurality of first capacitances for setting said first capacitances in a charged or uncharged condition, said first capacitance being associated with one of said pair of bit line elements, means connected to said second and third capacitances of each of said pair of bit line elements and to said fourth capacitance of the other of said pair of bit line elements for charging said second and third capacitances up to approximately the same voltage and charging said fourth capacitance up to a voltage less than said same voltage, respectively, during a first portion of a sensing cycle, means interconnecting said first and second capacitances which are connected to said one bit line element and said second and fourth capacitances which are connected to said other bit line element actuable during a second portion of said sensing cycle for transferring or not transferring charge from said second to said first capacitance and for transferring charge from said second to said fourth capacitance, respectively, means interconnecting said second and third capacitances of said pair of bit line elements during a third portion of said sensine cycle for tranferring or not tranferring charge from said third capacitance to said second capacitance of said one of said pair of bit line elements and for transferring charge from said third to said second capacitance of the other of said pair of bit line elements, respectively, and means for electrically connecting said third capacitance of both of said pair of bit line elements to said amplifier during a fourth portion of said sensing cycle.

2. A sense amplifier according to claim 1 wherein aid first capacitances are storage devices exhibiting capacitance, said second capacitance is the bit line capacitance of a bit line element, said third capacitance is a capacitor of substantialy the same capacitance as said first capacitance, and said fourth capacitance is a storage device exhibiting a capacitance not more than said first capacitance.

3. A sense amplifier according to claim 2 wherein said means connected to at least one of said plurality of first capacitances for setting said first capacitance includes a first actuable gate disposed in series with said first capacitance, word line and bit line address decoders, the outputs of which are connected to word and bit line drivers, the coincidental occurrence of said outputs actuating said first actuable gate to set said first capacitance in a charge or uncharged condition.

4. A sense amplifier according to claim 3 wherein said means connected to said second and third capacitances of said pair of bit line elements and to said fourth capacitance of said other of said pair of bit line elements for charging includes sources of charging potential, second actuable gates connected between said sources and said third capacitances and between said sources and said second capacitances via third actuable gates and between one of said sources and said fourth capacitance of said other of said pair of bit lines via one of said third actuable gates and a fourth actuable gate.

5. An amplifier according to claim 4 wherein said means interconnecting said first and second capacitances and said second and fourth capacitances during a second portion of said sensing cycle are said first and said fourth actuable gates, respectively.

6. An amplifier according to claim 5 wherein said means interconnecting said second and third capacitances of said pair of bit lines is said third actuable gate.

7. An amplifier according to claim 6 wherein said means for electrically connecting said third capacitance of both of said pair of bit line elements to said amplifier includes a pulsed source connected to sad amplifier actuable during said fourth portion for enabling said amplifier.

8. An amplifier according to claim 6 wherein said fourth storage device is a capacitor exhibiting not less than one-half the capacitance of said first capacitance.

9. In a memory array for storing information in the form of charge on a plurality of stored charge memory devices connected to pairs of bit lines elements via actuable gating devices, said elements having an associated bit line capacitance a sense amplifier for sensing the charge condition of at least a selected one of said memory devices comprising:

a reference charge storage device connected via a first actuable gate to each of said bit line elements, amplifier means hving first and second terminals responsive to a difference in voltage at said terminals, bucket brigade sense amplifier means having an output capacitance connected between each said terminal and a bit line element, charging means connected to each said bucket brigade amplifier means for charging said output capacitances and said bit line capacitances to approximately the same voltage and to one of said reference charge storage devices via said first actuable gate for charging said reference device to a voltage less than said same voltage, actuable pulsed sources connected to said gating device of said selected memory device and said actuable gate of said reference device for transferring charge from said bit line capacitance of one of said bit line elements when said memory device is empty of charge or transferring no charge when said memory device is filled with charge to charge up to or hold said memory device at said same voltage and for tranferring charge from said bit line capacitance of the other of said bit line elements to its associated reference device to charge it to said voltage less than said same voltage, and means connected to each of said bucket brigade amplifiers and said output capacitances for transferring a charged or uncharged condition from one output capacitance to said bit line capacitance of said one of said bit line elements and transferring a charged condition from the other of said output capacitances to said bit line capacitance of said other of said bit line elements to provide at one terminal said same voltage or zero voltage and at the other terminal said voltage less than said same voltage.

10. In a memory array a sense amplifier according to claim 9 further including means connected to said amplifier means for enabling it when said same voltage or zero voltage appears on said one terminal and said voltage less than said same voltage appears on said other terminal.

11. In a memory array a sense amplifier according to claim 10 further including means connected to said plurality of stored charge memory devices for setting at least one of said devices in a charged or uncharged condition.

12. In a memory array a sense amplifier according to claim 11 wherein said bucket brigade sense amplifiers includes a second actuable gate interconnecting said bit line capacitance and its output capacitance and, first and second pulsed voltage sources connected to said second actuable gate and to said output capacitance, respectively, said sources being actuated simultaneously to replenish or not replenish said bit line capacitance with charge from said output capacitance.

13. In a memory array a sense amplifier according to claim 12 wherein said means for setting includes an actuable gate disposed in series with each said memory device, word line and bit line decoders, the outputs of which are connected to word and bit line drivers, the coincidental occurrence of said outputs actuating said actuable gate to set said memory device in a charged or uncharged condition.

14. In a memory array a sense amplifier according to claim 13 wherein said amplifier means is a differential amplifier.

15. In a memory array a sense amplifier according to claim 13 wherein said amplifier means is a latch circuit.

16. In a memory array a sense amplifier according to claim 13 wherein said memory devices are devices exhibiting capacitance, said reference charge storage device is a device exhibiting capacitance not more than; the capacitance of said memory device and said output capacitance is a device exhibiting capacitance of approximatley equal value to the capacitance of said memory device.

17. A sense amplifier for sensing information in the form of stored charged comprising an amplifier responsive to differences in potential applied thereto, a pair of bit line elements electrically coupled to said amplifier, a plurality of first capacitances and second, third and fourth capacitance, electrically coupled to each of said bit line elements, means connected to at least one of said plurality of first capacitances and to said fourth capacitances for setting said first and said fourth capacitances in a charged and uncharged condition, said first capacitance and one of said fourth capacitances being associted with one of said pair of bit line elements, and the other of said fourth capacitances being associated with the other of said pair of bit line elements, means connected to said second and third capacitances of each of said pair of bit line elements for charging said second and third capacitances up to approximately the same voltage during a first portion of a sensing cycle, means interconnecting said first and second capacitances which are connected to said one line element and said second and fourth capacitances which are connected to said other bit line element actuable during a second portion of said sensing cycle for transferring or not transferring charge from said second to said first capacitance and for transferring charge from said second to said fourth capacitance, respectively, means interconnecting said second and third capacitances of, said pair of bit line elements during a third portion of said sensing cycle for transferring or not transferring charge from said third capacitance to said second capacitance of said one of said pair of bit line elements and for transferring charge from said third to said second capacitance of the other of said pair of bit line elements, respectively, and means for electrically connecting said third capacitance of both of said pair of bit line elements to said amplifier during a fourth portion of said sensing cycle.

18. A sense amplifier according to claim 17 wherein said amplifier is a differential amplifier.

19. A sense amplifier according to claim 17 wherein said amplifier is a latch circuit.

20. A sense amplifier according to claim 17 further including charging means connected to said fourth capacitances for charging them during an interval outside of said sensing cycle.

21. A sense amplifier according to claim 17 wherein said first capacitances are storage devices exhibiting capacitance, said second capacitance is the bit line capacitance of a bit line element, said third capacitance is a capacitor of substantially the same capacitance as said first capacitance, and said fourth capacitancee is a storage device exhibiting a capacitance not greater than said first capacitance.

22. An amplifier according to claim 21 wherein said fourth storage device is a capacitor exhibiting not less than one-half the capacitance of said first capacitance.

23. A sense amplifier according to claim 17 wherein said means connected to at least one of said plurality of first capacitances for setting said first capacitance includes a first actuable gate disposed in series with said first capacitance, word line and bit line address decoders, the outputs of which are connected to word and bit line drivers, the coincidental occurrence of said outputs actuating said first actuable gate to set said first capacitance in a charged or uncharged condition.

24. A sense amplifier according to claim 23 wherein said means connected to said second and third capacitances of said pair of bit line elements includes sources of charging potential, second actuable gates connectee between said sources and said third capacitances and between said sources and said second capacitances via third actuable gates.

25. An amplifier according to claim 24 wherein said means interconnecting said first and second capacitances and said second and fourth capacitance during a second portion of said sensing cycle are said first and said fourth actuable gates, respectively.

26. An amplifier according to claim 25 wherein said measn interconnecting said second and third capacitances of said pair of bit lines is said third actuable gate.

27. An amplifier according to claim 26 wherein said means for electrically connecting said third capacitance of both of said pair of bit line elements to said amplifier includes a pulsed source connected to said amplifier actuable during said fourth portion for enabling said amplifier.

28. An amplifier according to claim 27 wherein said first capacitances are capacitors.

29. An amplifier according to claim 28 wherein said first, second, third and fourth actuable gates are field effect transistors.

30. An amplifier according to claim 29 wherein said first actuable gate is a field effect transistor, the gate of which is connected to said word line driver and another terminal of which is connected to said bit line driver.

* * * * *